United States Patent [19]

Ishiwa et al.

[11] Patent Number: 5,420,192

[45] Date of Patent: May 30, 1995

[54] GLASS-REINFORCED POLYCARBONATE RESIN COMPOSITION

[75] Inventors: Kenichi Ishiwa, Oyama; Hideyuki Itoi, Utsunomiya, both of Japan

[73] Assignee: General Electric Company, Pittsfield, Mass.

[21] Appl. No.: 318,401

[22] Filed: Oct. 5, 1994

[30] Foreign Application Priority Data

Oct. 6, 1993 [JP] Japan .................. 5-272923

[51] Int. Cl.$^6$ ............................................ C08K 5/04
[52] U.S. Cl. ................................ 524/494; 524/493; 524/611
[58] Field of Search .............. 524/493, 494, 611

[56] References Cited

U.S. PATENT DOCUMENTS 5,037,937  8/1991  Komatsu et al. ............... 524/494
5,326,793  7/1994  Gallucci et al. ................ 524/494
5,360,861  11/1994  Campbell ....................... 524/494

*Primary Examiner*—Morton Foelak

[57] ABSTRACT

A resin composition containing 99–50 parts by weight of (A), a copolymeric polycarbonate having the constituent units described by formulas (1) and (2), hereinbelow, and in which the constituent unit in formula (2) accounts for 2–90 mole percent of the constituent units (1) and (2) and 1–50 parts by weight of (B) glass fiber having a mean fiber diameter of less than 10 μm.

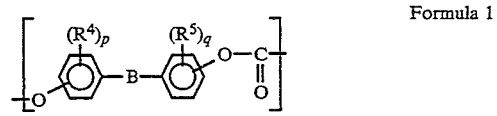

Formula 1

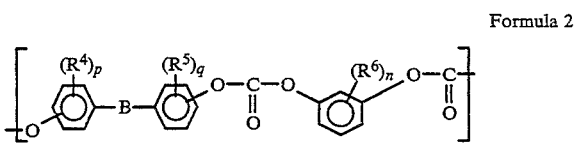

Formula 2 where each $R^4$ and $R^5$ is independently a halogen atom or a monovalent hydrocarbon radical; B is $-(R^1-)C(-R^2)-$ where each $R^1$ and $R^2$ is independently a hydrogen atom or a monovalent hydrocarbon radical, $-C(=R^3)-$ where $R^3$ is a divalent hydrocarbon radical, $-O-$, $-S-$, $-SO-$, or $-SO_2-$; $R^6$ is a hydrocarbon radical with 1–10 carbon atoms, a halide thereof, or a halogen atom; and each p, q, and n is independently an integer ranging from 0 to 4.

1 Claim, No Drawings

GLASS-REINFORCED POLYCARBONATE RESIN COMPOSITION

The present invention concerns a glass-reinforced polycarbonate resin composition, more specifically, a glass-reinforced resin composition in which copolymeric polycarbonate is the base resin.

Glass-reinforced polycarbonate resin is widely used as a housing material for cameras and power tools because of its mechanical strength, rigidity, and dimensional precision. An excellent surface appearance is required in these applications in order to increase product value.

However, it is more difficult to obtain a good visual appearance from glass-reinforced polycarbonate resin than from other resins such as glass-reinforced nylon or glass-reinforced polyester because of conspicuous glass floaters, i.e., glass fibers that protrude from the surface.

A method of molding at high mold temperatures was used in the prior art in order to overcome this problem, but the method was undesirable because it prolonged the molding cycle.

Methods of obtaining a good finish using finishing coatings have been carded out, but they are disadvantageous due to the high cost of the coatings and the difficulty of obtaining an attractive appearance by coating a surface that is already blemished by floaters.

Thus, the object of the present invention is to provide a glass-reinforced polycarbonate resin composition with improved surface appearance.

The inventors discovered that a remarkably improved surface appearance could be obtained by using copolymeric polycarbonate having a specific structure as the polycarbonate resin and blending glass fibers no more than 10 mm in diameter with it.

Thus, the present invention provides a glass-reinforced polycarbonate resin composition characterized by the fact that it contains 99–50 parts by weight of (A) a copolymeric polycarbonate having constituent units described by the following formula (3):

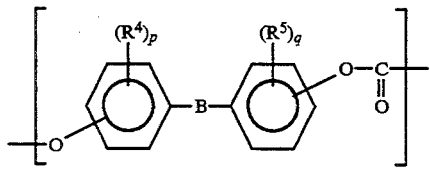

and the following formula (4):

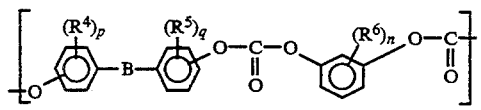

where each $R^4$ and $R^5$ is independently a halogen atom or a monovalent hydrocarbon radical; B is —($R^1$—)C(—$R^2$)— where each $R^1$ and $R^2$ is independently a hydrogen atom or a monovalent hydrocarbon radical, —C(=$R^3$)— where $R^3$ is a divalent hydrocarbon radical, —O—, —S—, —SO—, or —$SO_2$—, $R^6$ is a hydrocarbon radical with 1–10 carbon atoms, a halide thereof, or a halogen atom; and each p, q, and n is independently an integer ranging from 0 to 4, and in which the constituent unit, the said compound (4), amounts to 2–90 mole percent of the total combined amount of constituent units compound (3) and compound (4), and (B) 1–50 weight percent of glass fibers having a mean fiber diameter of less than 10 mm.

[0011]

The copolymeric polycarbonate used in the present invention must have the constituent units described by formula (3) and formula (4). The constituent unit described by formula (3) consists of a diphenol component and a carbonate component.

Diphenols that can be used to introduce the diphenol component are described by formula (5) below.

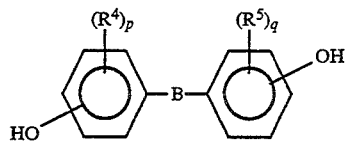

In this formula, $R^4$, $R^5$, B, p, and q are defined as above.

Diphenols that are effective in the present invention include, but are not limited to, bis(hydroxyaryl)alkanes such as bis(4-hydroxyphenyl)methane, 1,1-bis(4-hydroxyphenyl)ethane, 2,2-bis(4-hydroxyphenyl)propane (so-called bisphenol A), 2,2-bis(4-hydroxyphenyl)butane, 2,2-bis(4-hydroxylphenyl)octane, bis(4-hydroxyphenyl)phenylmethane, 2,2-bis(4-hydroxy-1-methylphenyl)propane, 1,1-bis(4-hydroxy-t-butylphenyl)propane, and 2,2-bis(4-hydroxy-3-bromophenyl)propane; bis(hydroxyaryl)-cycloalkanes such as 1,1-bis(4-hydroxyphenyl)cyclopentane, and 1,1-bis(4-hydroxyphenyl)-cyclohexane; dihydroxyaryl ethers such as 4,4'-dihydroxydiphenyl ether, and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl surfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethylphenyl sulfone. These substances may be used singly or in combinations of two or more. Particularly preferred of these is 2,2-bis(4-hydroxyphenyl)propane.

Precursor components for introducing the carbonate component include, for example, carbonic acid diesters such as diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate as well as carbonyl halide compounds such as phosgene. These substances may be used singly or in combinations of two or more. Diphenyl carbonate is particularly preferred.

The constituent unit described by formula (4) hereinabove consists of a diphenol component, a resorcinol and/or substituted resorcinol component, and a carbonate component. Diphenols such as those named hereinabove can be used to introduce the diphenol component. The carbonic acid diesters, mentioned hereinabove, or phosgene may be used as the carbonate component. In order to introduce the resorcinol and/or substituted resorcinol component, compounds described by the following formula (6) may be used singly or in combinations of two or more.

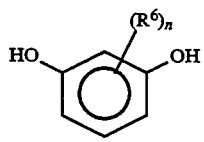

where $R^6$ and n are defined as above. Examples of this type of compound include resorcinol and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, and 2,3,4,6-tetrabromoresorcinol. Of these, resorcinol is particularly preferred.

The copolymeric polycarbonate component (A) possesses the two constituent units mentioned hereinabove, described by formula (3) and formula (4), in the following proportions. It contains the constituent unit described by formula (4) in amounts of 2–90 mole percent, preferably 2–40 mole percent, of the total of compound (3) and formula (4). If less than 2 mole percent of compound (4) is present, the glass transition temperature (Tg) is not lowered sufficiently, and, as a result, no improvement in fluidity is seen. If more than 90 mole percent is present, the good physical properties, for example, mechanical strength and heat resistance, of the prior art polycarbonates are not obtained.

The weight-average molecular weight of the copolymeric polycarbonate component (A) is usually 10,000 to 100,000, preferably 18,000 to 40,000. What is meant here by weight-average molecular weight is that measured by GPC (gel permeation chromatography), using polystyrene corrected for polycarbonate. In addition, Components (A) having an intrinsic viscosity of 0.35–0.65 dL/g measured at 25° C. in methylene chloride are preferred.

The copolymeric polycarbonate component (A) can be manufactured by any known polycarbonate manufacturing method, for example, by interfacial polymerization using phosgene or by melt polymerization. Melt polymerization is particularly preferred for reasons of environmental protection because toxic substances such as phosgene and methylene chloride are not used.

Any desired conditions (e.g, pressure and temperature) may be used for the melt polymerization reaction; commonly used conditions may be used. Specifically, a diphenol and a compound described by formula (6), hereinabove, are reacted with a carbonic acid diester at a temperature of preferably 80°–250° C., more preferably 100°–230° C., particularly preferably 120°–190° C., for preferably 0–5 hr, more preferably 0–4 hr, particularly preferably 0–3 hr, at ordinary pressure. Next, it is preferable to raise the reaction temperature while lowering the pressure of the reaction system and to carry out the reaction of the diphenol and compound described by formula (6) with the carbonic acid diester. Here, the reaction of the diphenol and compound described by formula (6) with the carbonic acid diester is finally carded out under a reduced pressure of 5 mm Hg or less, preferably 1 mm Hg or less, and temperature of 240°–320° C. or less.

This type of polycondensation reaction may be conducted as a continuous or batch process. The reactor used in this reaction may be a tank, tubular, or tower reactor.

In addition, this type of melt polymerization yields a copolymeric polycarbonate having better color, water resistance, and heat resistance than that afforded by other methods such as interfacial polymerization. This is true even if the constituent unit compound (4) is used in proportions exceeding 90 mole percent of the total of compound (3) and compound (4), i.e., in amounts in which resorcinol and/or substituted resorcinol exceed 90 moles per 100 moles of diphenol.

This copolymeric polycarbonate component (A) has sufficient impact strength even if it has phenol terminal groups, but a copolymeric polycarbonate having better low-temperature impact [strength] can be obtained by introducing larger terminal groups such as p-t-butylphenol, isononylphenol, isooctylphenol, m- or p-cumylphenol, (preferably p-cumylphenol) and chroman compounds such as chromanyl.

Next, component (B) is glass fiber with a mean fiber diameter of less than 10 mm, preferably less than 8 mm, particularly preferably less than 6 mm. If the mean fiber diameter exceeds 10 mm, the effect of the invention is not manifested. If the mean fiber diameter is less than 10 mm, any commercially available glass fiber, for example, chopped glass, rovings, or milled glass, may be used. Glass composition is not particularly restricted, but E glass is preferred.

Component (B) is blended in amounts of 1–50 parts by weight per 99–50 parts by weight of component (A), preferably 5–30 parts by weight per 95–70 parts by weight of component (A). If less than 1 part by weight of component (B) is used, sufficient rigidity is not obtained; if more than 50 parts by weight is used, moldability is lost.

The resin composition of the invention may contain other resins in addition to the above-named components. Examples of these other resins include polyesters such as PBT, ABS resin, AES resin, SAN resin, and polystyrene. Such resins may be used in amounts of up to 200 parts by weight per 100 parts by weight of component (A).

Other conventional additives may be added to the resin composition of the invention during mixing or molding in accordance with the resin's objective, provided that its physical properties are not compromised. Examples include pigments, dyes, heat-resistance enhancers, antioxidants, weather-resistance enhancers, lubricants, parting agents, plasticizers, flame retardants, fluidity enhancers, and antistatic agents.

There are no particular restrictions on the method for manufacturing the resin composition of the invention; conventional methods can be used satisfactorily. However, melt polymerization is generally preferred. A small amount of solvent can be used, but it is generally not necessary. Particular examples of equipment that can be used include extruders, Banbury mixers, rollers, kneaders, and the like; they can be used in batch or continuous processes. The mixing order for the components is not restricted.

The present invention is described in further detail hereinbelow, using working examples. The following components were used in the working examples.

Component (A)

RS-PC: Copolymeric polycarbonate manufactured in the following manner.

0.22 kilomoles of bisphenol A (made by G.E. Plastics Japan K.K.), 0.22 kilomoles of resorcinol, and 0.44 kilomoles of diphenyl carbonate (made by Eni Co.) were charged to a first tank-type stirrer (250 L capacity) and dissolved at 140° C. While maintaining this temperature, the resulting mixture was transferred to a second tank-type stirrer (50 L capacity) at a rate of 0.16 kilomole/hr, based on the bisphenol A content. The temperature in the second tank-type stirrer was maintained at 180° C.

Here, 0.04 moles/hr of tetramethylammonium hydroxide and 0.00016 moles/hr ($1 \times 10^{-6}$ moles/mole of bisphenol A) of sodium hydroxide were added as catalysts, and [the mixture] was stirred for an adjusted residence time of 30 min.

Next, this reaction solution was transferred to a third tank-type stirrer (50 L capacity) at a rate of 0.16 kilomoles per hour, based on the bisphenol A content. The temperature and pressure in the third tank-type stirrer were 210° C. and 200 mm Hg, respectively. The mixture was stirred for an adjusted residence time of 30 min, while withdrawing and discarding phenol.

Next, this reaction solution was transferred to a fourth tank-type stirrer (50 L capacity) at a rate of 0.16 kilomoles per hour, based on the bisphenol A content. The temperature and pressure in the fourth tank-type stirrer were 240° C. and 15 mm Hg, respectively. [The mixture] was stirred for an adjusted residence time of 30 min, while withdrawing and discarding phenol. The intrinsic viscosity h of the reaction product obtained when the reaction achieved a steady state was 0.15 dL/g.

Next, this reaction product was pressurized using a gear pump, transferred to a centrifugal thin-film evaporator at a rate of 0.16 kilomoles per hour, based on the bisphenol A content, and the reaction was continued. The temperature and pressure in the thin-film evaporator were controlled at 270° C. and 2 mm Hg, respectively. The reaction product was transferred from the bottom of the evaporator to a two-shaft lateral-type stirring polymerization tank controlled at 290° C. and 0.2 mm Hg (L/D=3, stirring element rotational diameter 220 mm, internal capacity 80 L) at a rate of 0.16 kilomoles per hour (approximately 40 kg/hr), based on the bisphenol A content, and polymerized at a residence time of 30 min. The intrinsic viscosity h of this product was 0.49 dL/g. The product was a copolymeric polycarbonate containing compound (7) and compound (8) in the following formulas in a 50:50 ratio. This is abbreviated as RS-PC hereinbelow.

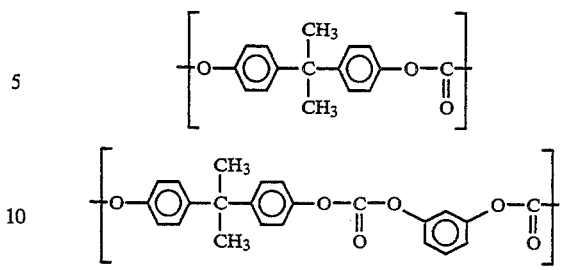

PC: The bisphenol A polycarbonate used for comparison (proprietary name LEXAN, made by GE Plastics Japan K.K.) had an intrinsic viscosity of 0.46 dL/g measured in methylene chloride at 25° C.

Component B

Glass fiber: Chopped glass having a mean fiber diameter of 13 mm, 10 mm, and 6 mm, respectively. (The strand-collecting agent for this chopped glass was urethane, and it contained aminosilane as a coupling agent.)

Working Examples 1-2 and comparative Examples 1-4

The various components were mixed in the proportions (weight ratios) shown in Table 1 and pelleted by extrusion through a single-screw extruder (65 mm) set at 280° C., 100 rpm, and 60 kg/hr (extrusion rate). These pellets were injection-molded using an 80-ton molding machine set at a temperature of 280° C. and with a mold temperature of 100° C. The resulting moldings were subjected to evaluation of surface appearance and measurement of Izod impact strength, flexural strength, and flexural modulus. The results are shown in Table 1.

In addition, surface appearance was evaluated on the basis of surface roughness. Surface roughness was measured using a surface roughness tester (a universal surface geometry gauge with a surface data processing capability, Model SE-3H, made by (KK) Kosaka Kenkyujo). Maximum height (R-max), 10-point mean roughness (R-z), and center line average height (R-a) were calculated in accordance with JIS B0601. The measurement distance was 2.5 mm, and the mean of three measurement values was used. Smaller numerical values indicate a smoother surface. Izod impact strength with a ⅛" notch was measured in accordance with ASTM D256. Flexural strength and flexural modulus were measured in accordance with ASTM D790.

TABLE 1

|  | Working Examples | | Comparative Examples | | | |
|---|---|---|---|---|---|---|
|  | 1 | 2 | 1 | 2 | 3 | 4 |
| Component | | | | | | |
| RS-PC | 90 | 90 | — | — | — | 90 |
| PC | — | — | 90 | 90 | 90 | — |
| Glass fiber | | | | | | |
| Mean fiber diameter 13 μm | — | — | 10 | — | — | 10 |
| Mean fiber diameter 10 μm | 10 | — | — | 10 | — | — |
| Mean fiber diameter 6 μm | — | 10 | — | — | 10 | — |
| Evaluation Tests | | | | | | |
| Surface Appearance | | | | | | |
| Surface Roughness | | | | | | |
| R-max (μm) | 2.9 | 1.5 | 6.2 | 6.4 | 6.1 | 3.5 |
| R-z (μm) | 2.0 | 1.0 | 4.8 | 4.6 | 4.7 | 2.4 |
| R-a (μm) | 0.25 | 0.13 | 0.49 | 0.47 | 0.48 | 0.30 |
| Izod Impact Strength | | | | | | |
| (kg-cm/cm) | 10 | 11 | 10 | 10 | 10 | 10 |
| Flexural Strength (kg/cm²) | 1190 | 1200 | 1170 | 1180 | 1200 | 1190 |

TABLE 1-continued

| | Working Examples | | Comparative Examples | | | |
|---|---|---|---|---|---|---|
| | 1 | 2 | 1 | 2 | 3 | 4 |
| Flexural Modulus (kg/cm$^2$) | 41000 | 42000 | 41000 | 41000 | 42000 | 41500 |

The surface appearance of the glass-reinforced polycarbonate resin composition of the invention is greatly improved. Therefore, the composition can be widely used in applications in which surface appearance affects product value as well as applications requiring qualities such as good mechanical strength, rigidity, and dimensional stability.

We claim:

1. Glass-reinforced polycarbonate resin composition characterized by the fact that it contains 99–50 parts by weight of (A) a copolymeric polycarbonate having constituent units described by the following formula (1):

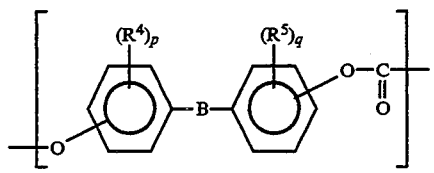

and the following formula (2):

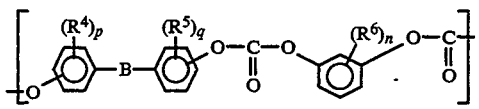

where each $R^4$ and $R^5$ is independently a halogen atom or a monovalent hydrocarbon radical; B is —($R^1$—)C-(—$R^2$)— where each $R^1$ and $R^2$ is independently a hydrogen atom or a monovalent hydrocarbon radical, —C(=$R^3$)— where $R^3$ is a divalent hydrocarbon radical, —O—, —S—, —SO—, or —SO$_2$—; $R^6$ is a hydrocarbon radical with 1–10 carbon atoms, a halide thereof, or a halogen atom; and each p, q, and n is independently an integer ranging from 0 to 4 and in which the constituent unit, the said compound (2), amounts to 2–90 mole percent of the total amount of both constituent units compound (1) and compound (2), and (B) 1–50 weight percent of glass fibers having a mean fiber diameter of less than 10 mm.

* * * * *